(12) United States Patent
Wang et al.

(10) Patent No.: US 8,598,825 B2
(45) Date of Patent: Dec. 3, 2013

(54) LEAD ANGLE CONTROL CIRCUIT, AND MOTOR DRIVE DEVICE AND MOTOR DRIVE SYSTEM USING THE LEAD ANGLE CONTROL CIRCUIT

(75) Inventors: Shen Wang, Yokohama (JP); Takehiro Hara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 13/369,434

(22) Filed: Feb. 9, 2012

(65) Prior Publication Data

US 2013/0076282 A1 Mar. 28, 2013

(30) Foreign Application Priority Data

Sep. 26, 2011 (JP) ................................ 2011-208932

(51) Int. Cl.
*H02K 23/00* (2006.01)
(52) U.S. Cl.
USPC ...... 318/437; 318/400.14; 318/466; 318/445; 318/254; 318/567; 8/159
(58) Field of Classification Search
USPC ......... 318/721, 722, 802, 723, 567, 445, 437, 318/466, 400.35, 400.6, 783, 430, 800; 173/200, 1, 216, 217; 8/159
See application file for complete search history.

(56) References Cited

U.S. PATENT DOCUMENTS

| | | | | |
|---|---|---|---|---|
| 4,276,504 A | * | 6/1981 | Nagase et al. | 318/721 |
| 5,057,753 A | * | 10/1991 | Leuthold et al. | 318/400.35 |
| 2004/0019979 A1 | * | 2/2004 | Kim et al. | 8/159 |
| 2005/0156549 A1 | * | 7/2005 | Suzuki et al. | 318/437 |

FOREIGN PATENT DOCUMENTS

| | | | |
|---|---|---|---|
| JP | 63114575 A | * | 5/1988 |
| JP | 2009-303287 | | 12/2009 |
| JP | 2010178488 A | * | 8/2010 |

* cited by examiner

*Primary Examiner* — Lincoln Donovan
*Assistant Examiner* — Jorge Carrasquillo
(74) *Attorney, Agent, or Firm* — Oblon, Spivak, McClelland, Maier & Neustadt, L.L.P.

(57) ABSTRACT

According to an embodiment, a lead angle control circuit is configured to control a lead angle of a motor drive signal driving a motor. The lead angle control circuit includes a control signal generating section, an upper limit voltage limit section and a lead angle data generating section. The lead angle data generating section is configured to generate a relationship line between lead angle data representing the lead angle and a lead angle control signal, and configured to generate the lead angle data based on the relationship line and the lead angle control signal. The relationship line reaches an upper limit point from a lower limit point through a changing point. In the changing point, the lead angle control signal is a changing point voltage, and the lead angle data represents the lead angle corresponding to a lead angle setting voltage.

20 Claims, 11 Drawing Sheets

LEAD ANGLE CONTROL CIRCUIT, AND MOTOR DRIVE DEVICE AND MOTOR DRIVE SYSTEM USING THE LEAD ANGLE CONTROL CIRCUIT

CROSS REFERENCE TO RELATED APPLICATION

This application is based upon and claims the benefit of priority from the prior Japanese Patent Application No. 2011-208932 filed on Sep. 26, 2011 in Japan, the entire contents of which are incorporated herein by reference.

FIELD

Embodiments described herein relate generally to a lead angle control circuit, and a motor drive device and a motor drive system using the lead angle control circuit.

BACKGROUND

In a brushless motor (hereinafter referred to as a motor), although different depending on the usage, generally, if the rotational speed is increased or the motor current is increased, the current phase is delayed. Thus, in order to control the motor efficiently, lead angle control for controlling the lead angle to a suitable one corresponding to the motor current is required. In the conventional lead angle control circuit (semiconductor device), the lead angle control is performed assuming that the relationship between the motor current and the lead angle is a straight line.

However, optimum lead angle characteristics to the motor current may be a curved line. In the conventional lead angle control, since only control of a straight line can be performed, the lead angle cannot be controlled to an optimum lead angle, so that the efficiency of a motor is lowered.

Meanwhile, for example, there is considered a technique in which previously measured optimum lead angle characteristics of a motor is stored in a ROM of a microcomputer, and the lead angle is controlled based on the stored lead angle characteristics, the detected motor current and rotational speed. However, in this technique, since the microcomputer is required, it is inevitable that the lead angle control circuit becomes large in size and is complicated, and the cost is increased.

DETAILED DESCRIPTION

According to an embodiment, a lead angle control circuit is configured to control a lead angle of a motor drive signal driving a motor. The lead angle control circuit includes a control signal generating section, an upper limit voltage limit section, a lead angle data generating section. The control signal generating section is configured to generate a control signal corresponding to a motor current flowing through the motor. The upper limit voltage limit section is configured to receive an upper limit voltage and configured to output a lead angle control signal obtained by limiting a maximum value of the control signal to the upper limit voltage. The lead angle data generating section is configured to generate a relationship line between lead angle data representing the lead angle and the lead angle control signal, and configured to generate the lead angle data based on the relationship line and the lead angle control signal. The lead angle data generating section receives a changing point voltage and a lead angle setting voltage. The changing point voltage is less than the upper limit voltage. The relationship line reaches an upper limit point from a lower limit point through a changing point. In the changing point, the lead angle control signal is the changing point voltage, and the lead angle data represents the lead angle corresponding to the lead angle setting voltage. In the upper limit point, the lead angle control signal is the upper limit voltage, and the lead angle data represents a maximum lead angle.

Comparative Example

Before describing embodiments of the present invention, a lead angle control circuit of a comparative example obtained by the present inventors will be described with reference to FIGS. 11 to 15.

Figure 11:
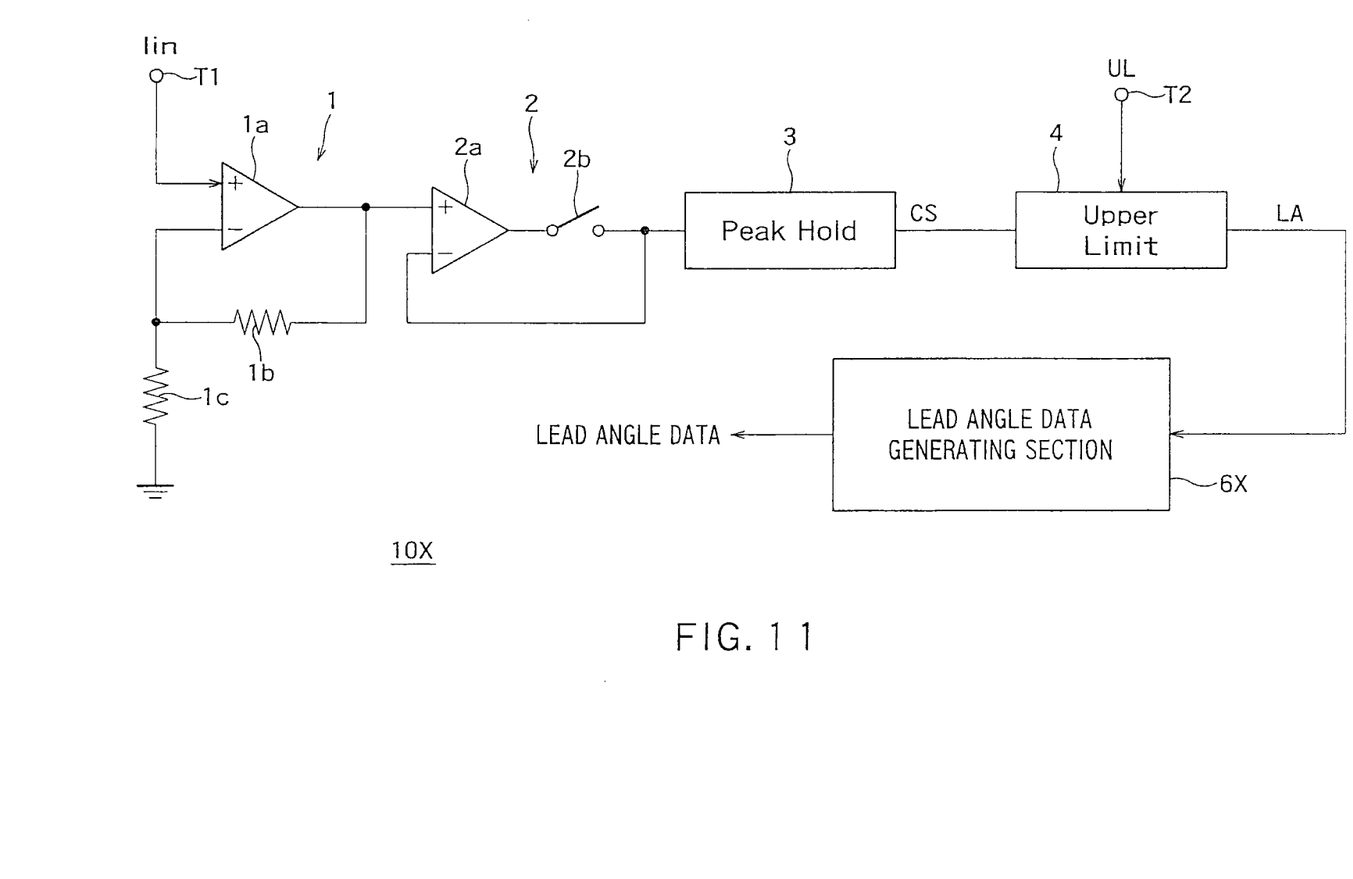
FIG. 11 is a block diagram showing a schematic configuration of a lead angle control circuit according to a comparative example.

FIG. 11 is a block diagram showing a schematic configuration of a lead angle control circuit 10X according to the comparative example. The lead angle control circuit 10X controls the lead angle of a motor drive signal that drives a motor (not shown) and is constituted as a portion of a motor control IC (Integrated Circuit), for example.

A motor current signal Iin is obtained by detecting a motor current flowing through a motor by shunt resistor (not shown) and so on. An amplifying section 1 gain-multiplies the motor current signal Iin. A peak-hold circuit constituted of a sampling section 2 and a peak-hold section 3 peak-holds the gain-multiplied signal to convert the signal into a control signal CS which is a DC voltage. An upper-limit voltage limit section 4 compares an upper limit voltage UL set from outside with the control signal CS and outputs a lead angle control signal LA in which the maximum value of the control signal CS is limited to the upper limit voltage UL. A lead angle data generating section 6X generates a relational straight line (a relational straight line a2 of FIG. 13 to be described later) between lead angle data and the lead angle control signal LA and generates the lead angle data based on the relational straight line and the lead angle control signal LA. The generated lead angle data represents the lead angle.

Figure 12:
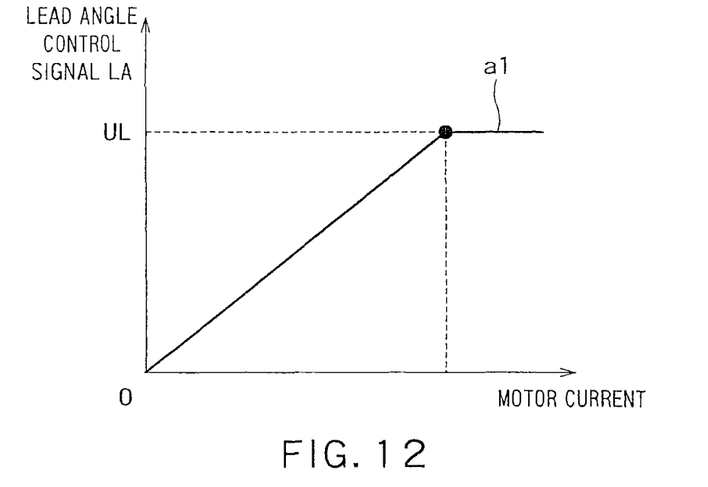
FIG. 12 is a view showing a relationship between a motor current and a lead angle control signal in the lead angle control circuit according to the comparative example.

FIG. 12 is a view showing a relationship between the motor current and the lead angle control signal LA in the lead angle control circuit 10X according to the comparative example. As described above, the maximum value of the lead angle control signal LA is the upper limit voltage UL. As shown in FIG. 12, the motor current and the lead angle control signal LA are proportional to each other within a range that the lead angle control signal LA is not more than the upper limit voltage UL (relational line a1).

Figure 13:
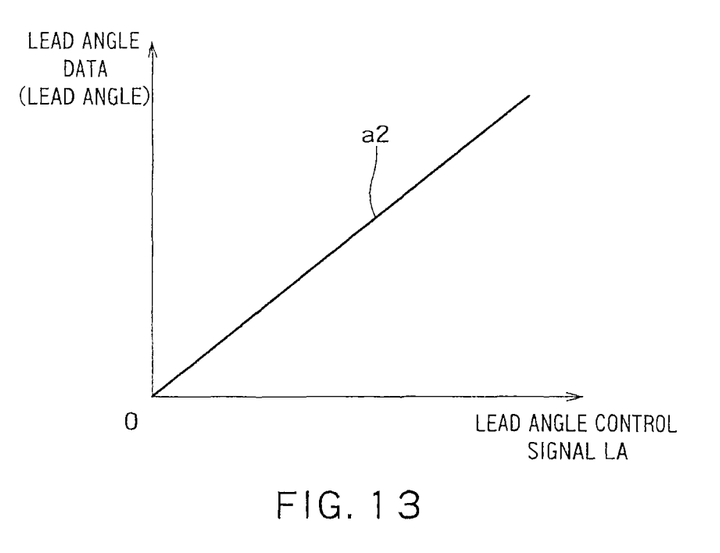
FIG. 13 is a view showing the relational straight line between the lead angle control signal and a lead angle data (lead angle) in the lead angle control circuit according to the comparative example.

FIG. 13 is a view showing the relational straight line a2 between the lead angle control signal LA and the lead angle data (lead angle) in the lead angle control circuit 10X according to the comparative example. As shown in FIG. 13, the lead angle control signal LA and the lead angle data (lead angle) have a linear relationship.

Figure 14:
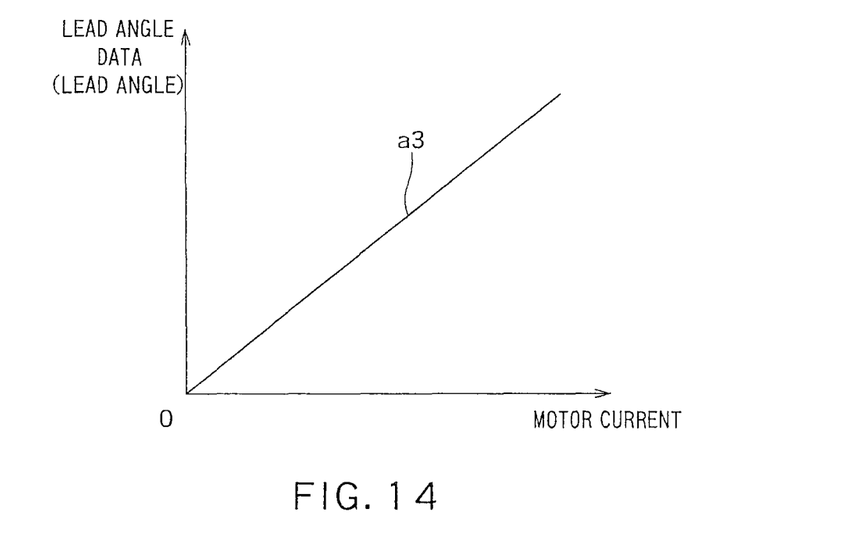
FIG. 14 is a view showing a relationship between the motor current and the lead angle data (lead angle) in the lead angle control circuit according to the comparative example.

FIG. 14 is a view showing a relationship between the motor current and the lead angle data (lead angle) in the lead angle control circuit 10X according to the comparative example. This relationship is obtained from the relationship of FIG. 12 and the relationship of FIG. 13. As shown in FIG. 14, in the lead angle control circuit 10X of the comparative example, the lead angle is controlled corresponding to the motor current, assuming that the relationship between the motor current and the lead angle data (lead angle) is a straight line a3.

Figure 15:
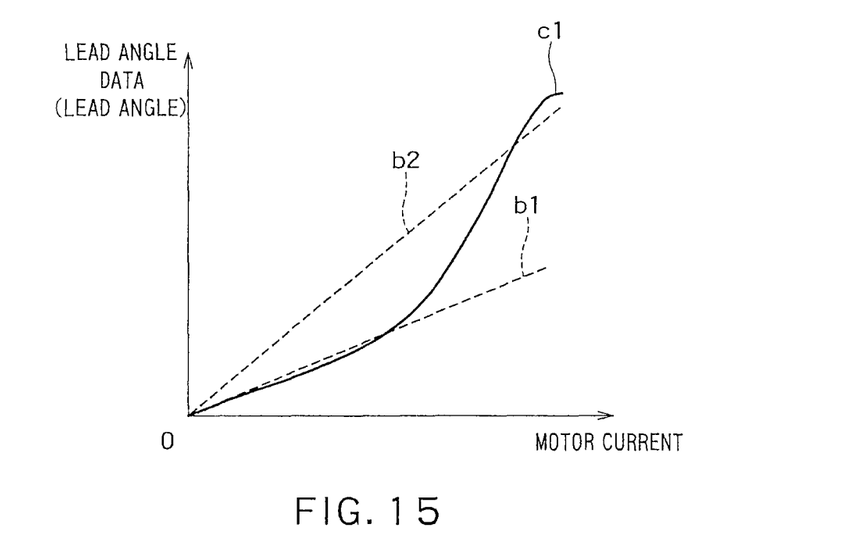
FIG. 15 is a view showing a relationship between an optimum motor current and the lead angle data (lead angle) according to the comparative example.

FIG. 15 is a view showing a relationship between an optimum motor current and the lead angle data (lead angle) according to the comparative example. As shown in FIG. 15, optimum lead angle characteristics with respect to the motor current may be a curved line (nonlinear shape) c1 depending on a motor. As an example of such a motor, there is a motor for a fan, for example. Meanwhile, in the lead angle control circuit 10X of the comparative example, as described above, the lead angle can only be controlled based on a straight line b1 or a straight line b2. Accordingly, since a difference between the optimum lead angle and a controlled lead angle becomes large depending on the motor current, the efficiency of the motor is lowered.

Hereinafter, embodiments of the present invention will be described with reference to the drawings. Those embodiments do not limit the present invention.

First Embodiment

Figure 1:
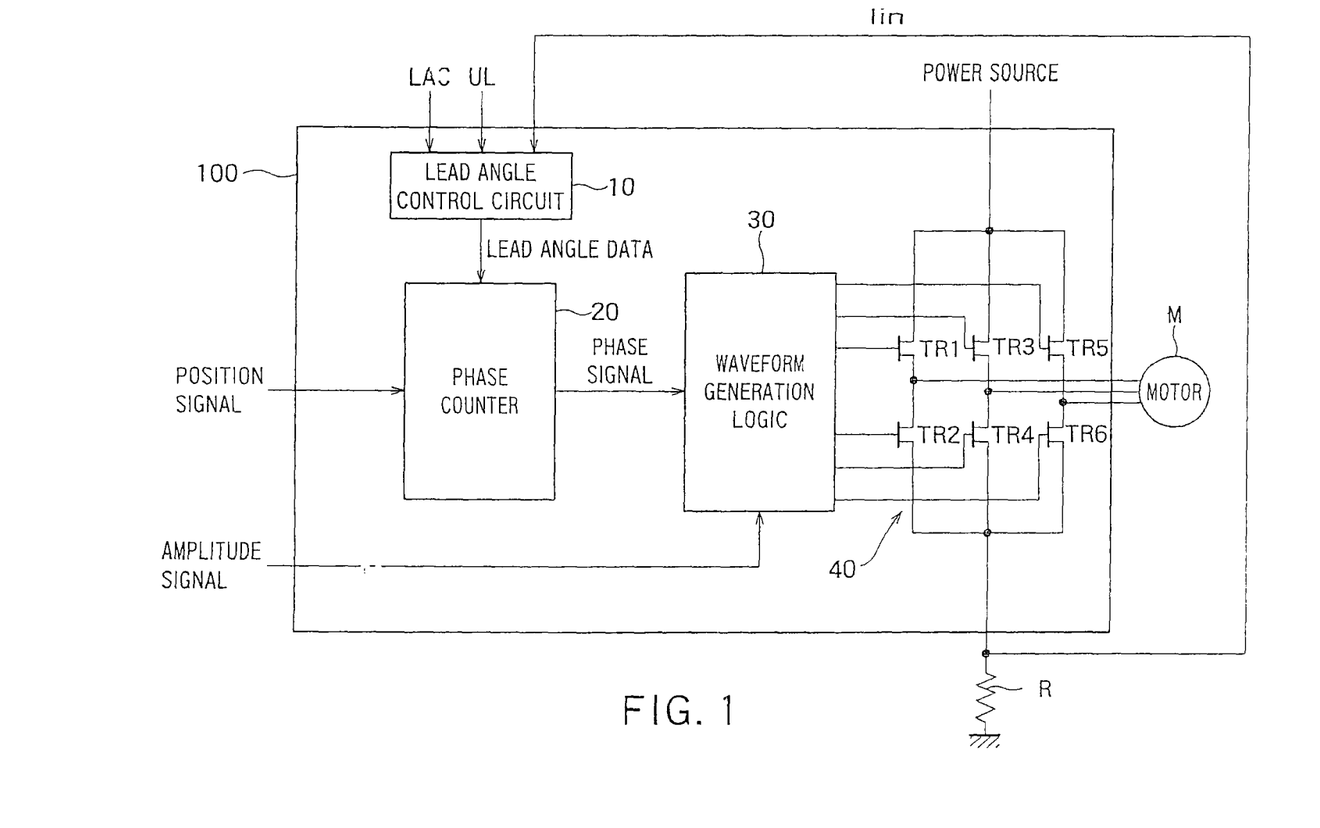
FIG. 1 is a block diagram showing a schematic configuration of a motor drive system according to a first embodiment.

FIG. 1 is a block diagram showing a schematic configuration of a motor drive system according to a first embodiment.

As shown in FIG. 1, the motor drive system includes a motor drive device 100, a motor M, and a resistor R.

The motor drive device 100 drives the motor M by a three-phase motor drive signal in which a lead angle is controlled. The motor drive device 100 is constituted as a motor control IC, for example. The motor M is a motor for a fan, for example.

The motor drive device 100 has a lead angle control circuit (semiconductor device) 10, a phase counter 20, a waveform generation logic 30, and a switching section 40.

The lead angle control circuit 10 generates lead angle data representing the lead angle based on an upper limit voltage UL and a lead angle setting voltage LAC supplied from outside and a motor current signal Iin corresponding to the motor current flowing through the motor M. The lead angle control circuit 10 changes the lead angle data to control the lead angle of a motor drive signal which drives the motor M. As described later, the lead angle control circuit 10 performs control so that the relationship between the motor current and the lead angle data is a broken line.

The phase counter 20 generates a phase signal, in which the lead angle is controlled, based on a position signal representing the rotational position of the motor M and the lead angle data generated in the lead angle control circuit 10. For example, the phase counter 20 generates a phase signal in which the lead angle represented by the lead angle data is added to the phase of the position signal. For example, the position signal is supplied from a sensor (not shown) which detects the rotational position of the motor M.

The waveform generation logic 30 generates a switching section drive signal which drives the switching section 40, based on the phase signal generated in the phase counter 20 and an amplitude signal supplied from outside. For example, the switching section drive signal is a PWM signal, and a pulse width of the PWM signal is controlled corresponding to the amplitude signal.

The switching section 40 has six switching transistors TR1 to TR6. The two switching transistors TR1 and TR2 are connected in series between a power source and a ground. Similarly, the two switching transistors TR3 and TR4 and the two switching transistors TR5 and TR6 are connected in series between the power source and the ground, respectively. The respective switching transistors TR1 to TR6 are controlled to on or off by the switching section drive signal generated by the waveform generation logic 30. According to this constitution, the switching section 40 supplies the three-phase motor drive signal, in which the lead angle is controlled, to the motor M from a connection point between the switching transistors TR1 and TR2, a connection point between the switching transistors TR3 and TR4, and a connection point between the switching transistors TR5 and TR6. The lead angle is a leading angle of the motor drive signal with respect to an induced voltage induced by a coil of the motor M.

The motor current flows from the power source to the ground through the switching section 40 and the coil of the motor M. The motor current is converted into the motor current signal Iin that is a voltage, using a resistor R connected between the switching section 40 and the ground.

The phase counter 20, the waveform generation logic 30, and the switching section 40 function as a motor drive signal generating section. Namely, the motor drive signal generating section generates the motor drive signal based on the lead angle data and the position signal representing the rotational position of the motor M.

Figure 2:
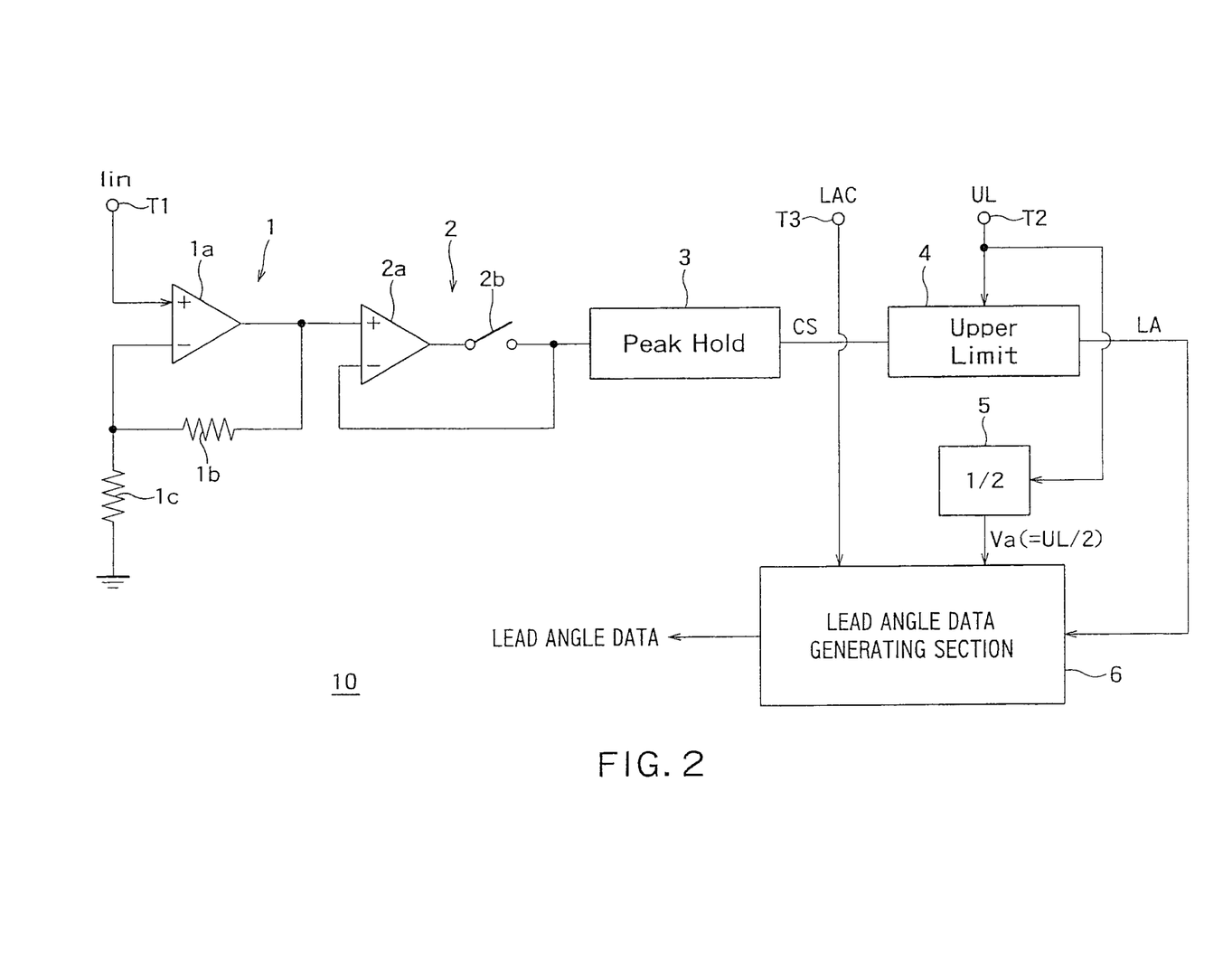
FIG. 2 is a block diagram showing a schematic configuration of a lead angle control circuit according to the first embodiment.

Next, the lead angle control circuit 10 will be described in detail. As described hereinafter, the lead angle control circuit 10 newly adds a terminal T3 to the lead angle control circuit 10X of the comparative example and inputs the lead angle setting voltage LAC supplied to the terminal T3 and a voltage UL/2, which is ½ of the upper limit voltage UL, to a lead angle data generating section 6, and the relationship between the lead angle control signal LA and the lead angle is improved using these voltages.

FIG. 2 is a block diagram showing a schematic configuration of the lead angle control circuit 10 according to the first embodiment. As shown in FIG. 2, the lead angle control circuit 10 has the amplifying section 1, the sampling section 2, the peak-hold section 3, and the upper-limit voltage limit section 4, a voltage-dividing circuit 5, and the lead angle data generating section (lead angle control logic) 6.

The amplifying section 1, the sampling section 2, and the peak-hold section 3 function as a control signal generating section. The control signal generating section generates the control signal CS corresponding to the current flowing through the motor M, based on the motor current signal Iin supplied to the terminal T1.

The amplifying section 1 includes an amplifier 1a and resistors 1b and 1c. The amplifying section 1 is a non-inverting amplifier circuit and amplifies the supplied motor current signal Iin with a predetermined gain determined by the resistors 1b and 1c.

The sampling section 2 and the peak-hold section 3 function as a peak-hold circuit which peak-holds a signal amplified by the amplifying section 1 and converts the signal into a DC voltage. The sampling section 2 includes an amplifier 2a and a switch 2b. The sampling section 2 functions as a buffer when the switch 2b is on, and the sampling section 2 dose not output a signal when the switch 2b is off. According to this constitution, the sampling section 2 samples the signal amplified by the amplifying section 1 by the on/off operation of the switch 2b. The peak-hold section 3 peak-holds the sampled signal to output the control signal CS, which is the DC voltage.

Instead of the peak-hold circuit, an average circuit which calculates an average value of the signal amplified by the amplifying section 1 or the like may be used.

The upper-limit voltage limit section 4 receives the upper limit voltage UL from the terminal T2 and compares the upper limit voltage UL with the control signal CS to output the lead angle control signal LA in which the maximum value of the control signal CS is limited to the upper limit voltage UL.

The voltage-dividing circuit 5 voltage-divides the upper limit voltage UL into ½ and supplies the voltage-divided voltage UL/2 as a changing point voltage Va to the lead angle data generating section 6. Namely, the changing point voltage Va is less than the upper limit voltage UL.

The lead angle data generating section 6 generates a relationship line between the lead angle data representing the lead angle and the lead angle control signal LA and generates the lead angle data based on the relationship line and the lead angle control signal LA. The lead angle data generating section 6 further receives the lead angle setting voltage LAC from the terminal T3.

Figure 3:
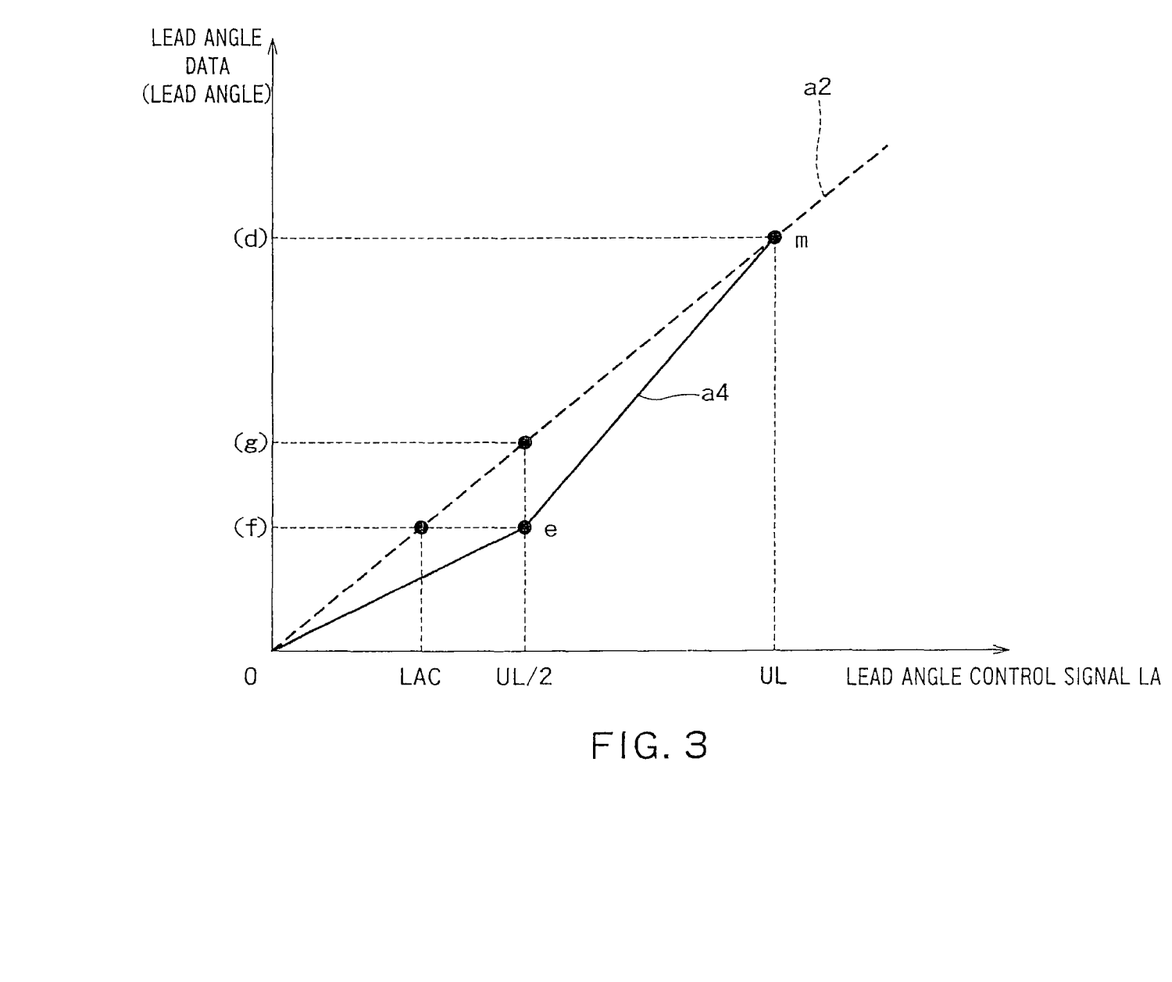
FIG. 3 is a view showing a relationship line between a lead angle control signal and a lead angle data (lead angle) in the lead angle control circuit according to the first embodiment.

Next, the relationship line in the lead angle data generating section 6 will be described.

FIG. 3 is a view showing a relationship line a4 between the lead angle control signal LA and the lead angle data (lead angle) in the lead angle control circuit 10 according to the first embodiment. As described above, the lead angle data represents the lead angle, and the relationship line a4 is equivalent to a relationship line between the lead angle control signal LA and the lead angle. In FIG. 3, the horizontal axis represents the lead angle control signal LA, and the vertical axis represents the lead angle data (lead angle).

The relationship line a4 reaches from an original point (lower limit point) to an upper limit point m through a changing point e. In the changing point e, the lead angle control signal LA is the changing point voltage Va (=UL/2), and the lead angle data represents the lead angle f corresponding to the lead angle setting voltage LAC. Namely, the lead angle data (lead angle) at the changing point e can be determined to a desired value corresponding to the lead angle setting voltage LAC. In the upper limit point m, the lead angle control signal LA is the upper limit voltage UL, and the lead angle data represents the maximum lead angle d.

In the relationship line a4, a portion between the original point and the changing point e and a portion between the changing point e and the upper limit point m are straight lines. Namely, the relationship line a4 is a broken line whose inclination is changed at the changing point e.

As shown in FIG. 3, if the relationship between the lead angle control signal LA and the lead angle data is a straight line a2 shown in the comparative example of FIG. 13, the lead angle data represents the lead angle d when the lead angle control signal LA is the upper limit voltage UL. When the lead angle control signal LA is ½ of the upper limit voltage UL, the lead angle data represents a lead angle g. When the lead angle control signal LA is the lead angle setting voltage LAC, the lead angle represents the lead angle f. In this case, the lead angle setting voltage LAC is lower than the voltage UL/2, and namely, the lead angle f is smaller than the lead angle g.

Meanwhile, in the relationship line a4 between the lead angle control signal LA and the lead angle data of the present embodiment, when the lead angle control signal LA is ½ of the upper limit voltage UL, the lead angle represented by the lead angle data becomes small from the lead angle g to the lead angle f. Accordingly, the relationship line a4 is a broken line as described above.

The lead angle setting voltage LAC may be higher than the voltage UL/2, and namely, the lead angle f may be larger than the lead angle g.

Figure 4:
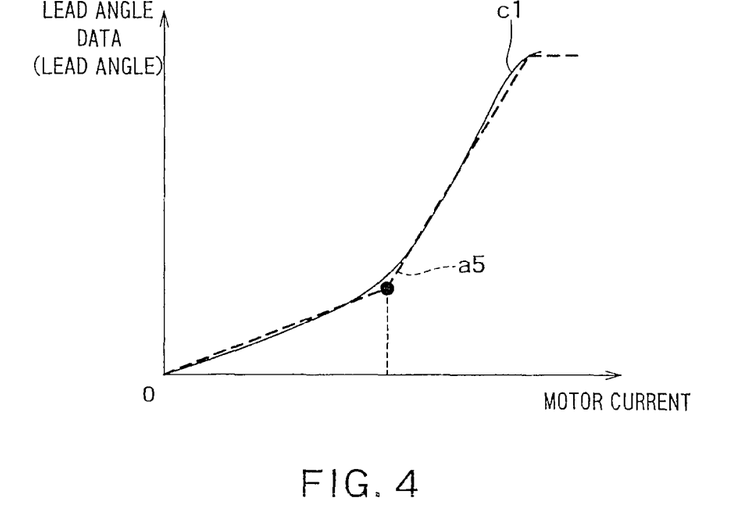
FIG. 4 is a view showing a relationship between a motor current and the lead angle data (lead angle) in the lead angle control circuit according to the first embodiment.

FIG. 4 is a view showing a relationship between the motor current and the lead angle data (lead angle) in the lead angle control circuit 10 according to the first embodiment. Since the motor current and the lead angle control signal LA are proportional to each other, by virtue of the above-described relationship between the lead angle control signal LA and the lead angle data (lead angle), the relationship between the motor current and the lead angle data (lead angle) is a broken line as shown in FIG. 4. Namely, the lead angle can be controlled based on the broken line a5 approximating the curved line c1 of the optimum lead angle characteristics.

Next, a specific tuning method for adjusting the relationship between the motor current and the lead angle to make the relationship closer to the optimum lead angle characteristics will be described with reference to FIGS. 5 to 8.

Figure 5:
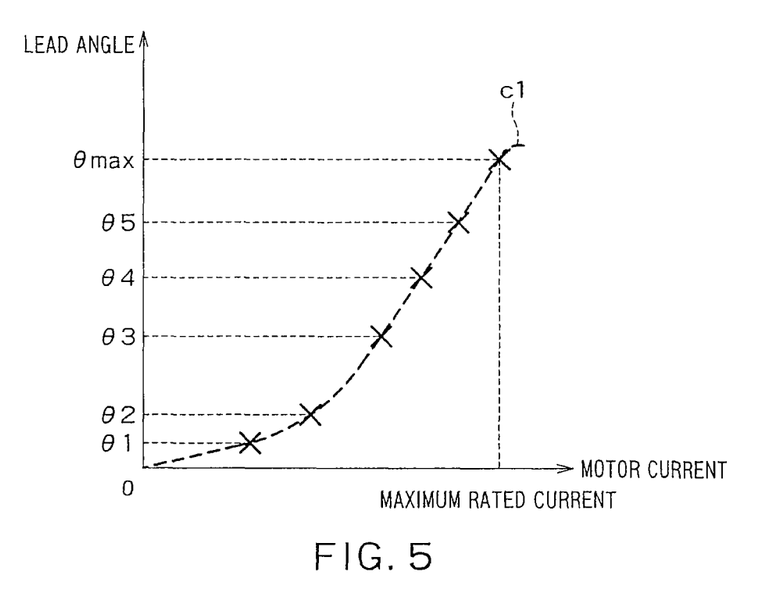
FIG. 5 is a view showing a relationship between the measured motor current and the lead angle according to the first embodiment.
Figure 6:
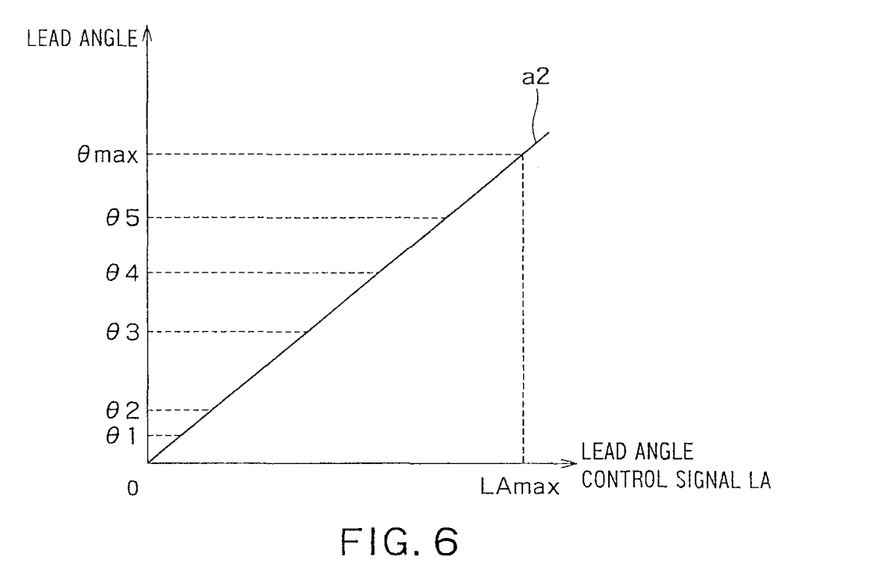
FIG. 6 is a view showing a relationship between the lead angle control signal and the lead angle in the lead angle control circuit according to the first embodiment.
Figure 7:
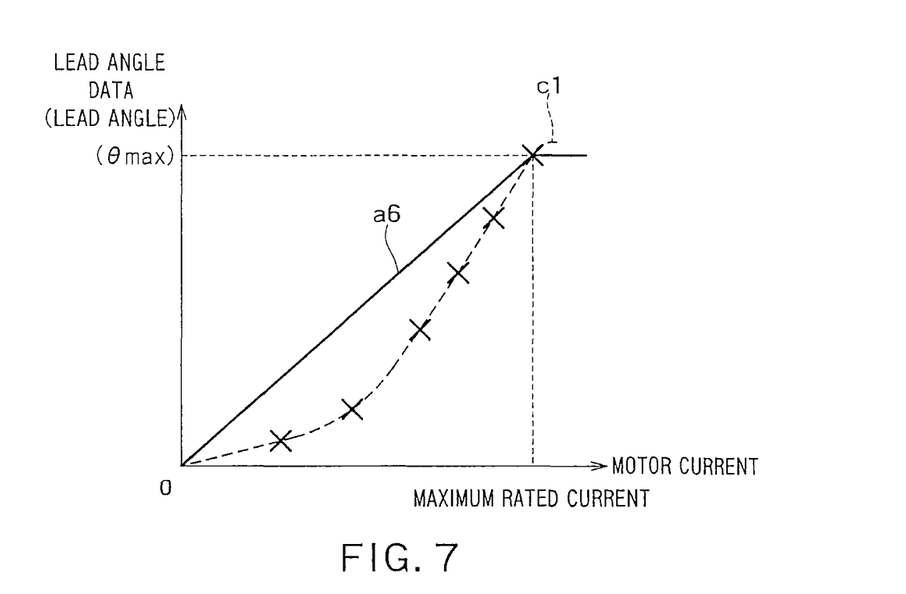
FIG. 7 is a view showing a relationship between the motor current and the lead angle data (lead angle) in the lead angle control circuit according to the first embodiment.
Figure 8:
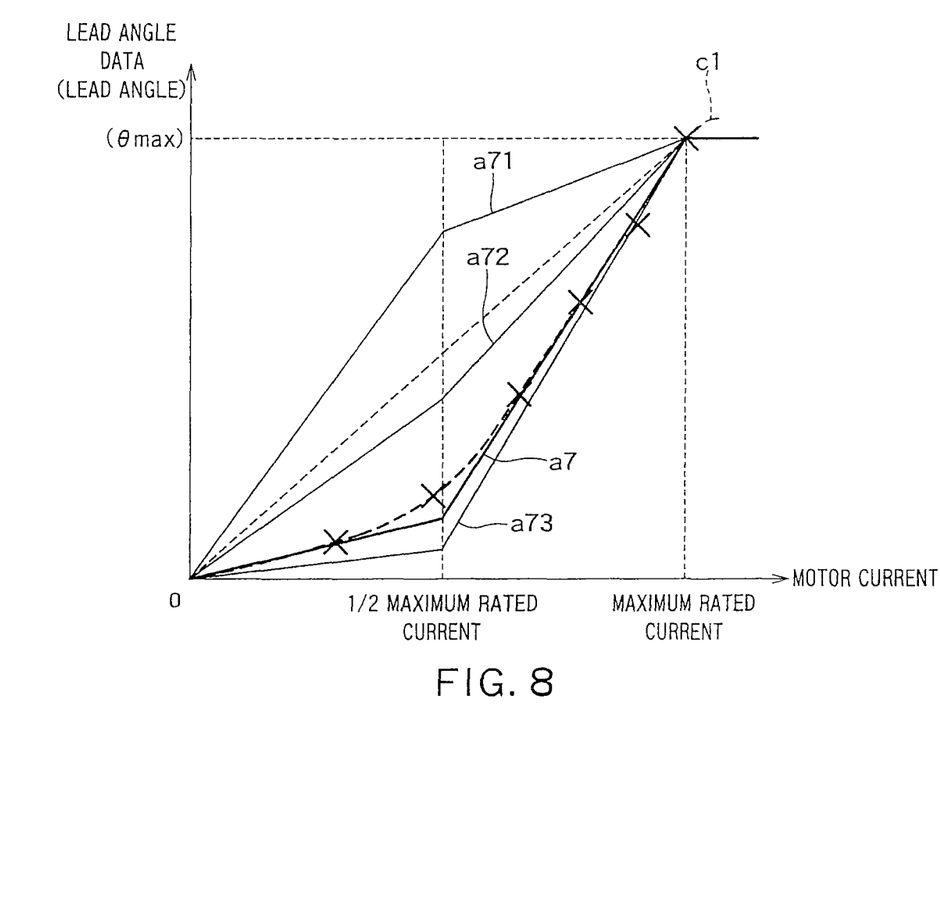
FIG. 8 is a view showing a relationship between the motor current and the lead angle data (lead angle) in the lead angle control circuit according to the first embodiment.

FIG. 5 is a view showing a relationship between the measured motor current and the lead angle. FIG. 6 is a view showing a relationship between the lead angle control signal LA and the lead angle in the lead angle control circuit 10. FIG. 7 is a view showing a relationship between the motor current and the lead angle data (lead angle) in the lead angle control circuit 10. FIG. 8 is a view showing a relationship between the motor current and the lead angle data (lead angle) in the lead angle control circuit 10.

First, the curved line c1 of the optimum lead angle characteristics is measured. Specifically, the motor drive system of FIG. 1 is used, and as shown in FIG. 5, optimum lead angles θ1 to θ5, and θmax at some points from the motor current 0 to the maximum rated current are measured.

Next, as shown in FIG. 6, the lead angle control signal LA corresponding to each lead angle is obtained from the relationship in the straight line a2. For example, the lead angle control signal LA input to the lead angle data generating section 6 is increased from 0, and the lead angle control signal LA corresponding to each lead angle is obtained. According to this constitution, it can be understood that when the lead angle is the maximum value θmax, the lead angle control signal LA is a maximum voltage LAmax.

Based on the above result, the gain of the amplifying section 1 is determined so that when the motor current is the maximum rated current, the lead angle control signal LA is the maximum voltage LAmax. Further, the maximum voltage LAmax as the upper limit voltage UL is input to the terminal T2. At that time, the relationship between the motor current and the lead angle data (lead angle) is a broken line a6 of FIG. 7. Namely, when the motor current is not less than the maximum rated current, the lead angle control signal LA is limited to the given upper limit voltage UL (the maximum voltage LAmax), and therefore, the lead angle data represents the lead angle θmax as the maximum value.

At the point where the motor current is ½ of the maximum rated current, the corresponding lead angle control signal LA is ½ of the upper limit voltage UL. As shown in FIG. 8, since the lead angle data (lead angle) at the above point can be freely adjusted by the lead angle setting voltage LAC, the relationship between the motor current and the lead angle data (lead angle) can be adjusted to broken lines a71, a72, a73, a7, and so on, for example. The lead angle setting voltage LAC is determined so as to be close to the initially measured curved line c1 of the optimum lead angle characteristics, and the finally determined lead angle characteristic is the broken line a7, for example.

As described above, according to the present embodiment, the relationship line a4 between the lead angle data and the lead angle control signal LA is generated, and the lead angle data is generated based on the relationship line a4 and the lead angle control signal LA. Then, the relationship line a4 passes through the changing point e. In the changing point e, the lead angle control signal LA is the changing point voltage Va (=UL/2), and the lead angle data represents the lead angle corresponding to the lead angle setting voltage LAC. Thus, the lead angle setting voltage LAC is adjusted, thereby the lead angle data at the changing point e, that is, the lead angle can be freely adjusted, so that the relationship line a4 which is a broken line can be adjusted. Namely, a degree of freedom in control of the lead angle can be improved. Accordingly, since the relationship line a4 close to the optimum lead angle characteristics can be obtained, lead angle control close to the optimum lead angle characteristics can be realized, and the efficiency of the motor M can be improved.

The terminal T3 and the voltage-dividing circuit 5 are added to the lead angle control circuit 10X of the comparative example, and, at the same time, the control of the lead angle data generating section 6 is changed from the control in the comparative example, whereby the above effects can be obtained. Thus, since a microcomputer or the like in which the optimum lead angle characteristics are stored is not required to be used, the cost of the entire system can be suitably controlled. Namely, the lead angle of the motor M can be suitably controlled with a simple structure.

Further, since the voltage UL/2 obtained by voltage-dividing the upper limit voltage UL is used as the changing point voltage Va, even if the maximum rated current is changed by change of the motor M or the like, the upper limit voltage UL is changed corresponding to the maximum rated current, whereby the changing point voltage Va is changed accordingly. Thus, a trouble for newly setting the changing point voltage Va can be avoided in such a case.

Second Embodiment

The present embodiment is different from the first embodiment in that a relationship line passes through two changing points.

Figure 9:
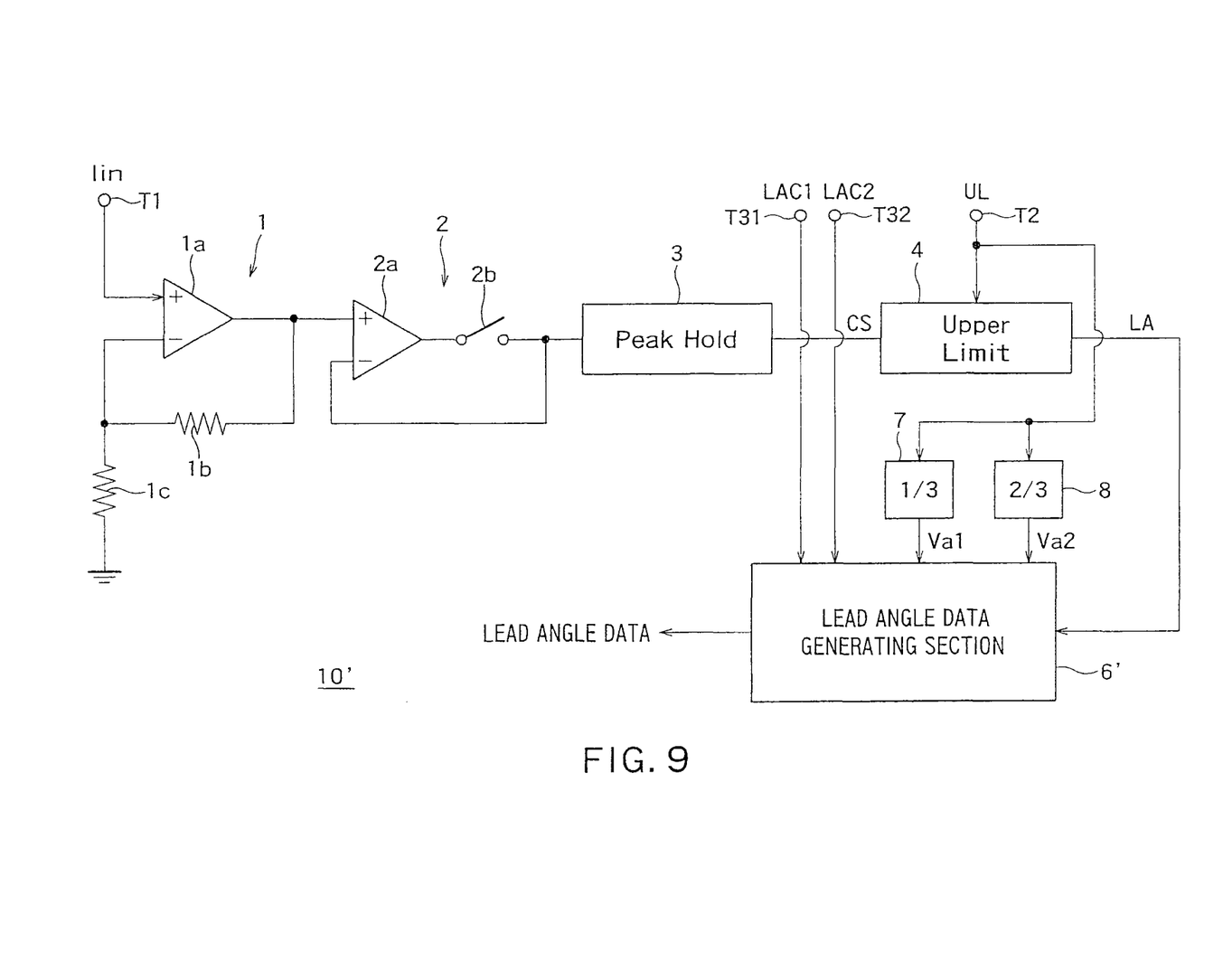
FIG. 9 is a block diagram showing a schematic configuration of a lead angle control circuit according to a second embodiment.

FIG. 9 is a block diagram showing a schematic configuration of a lead angle control circuit 10' according to the second embodiment. As shown in FIG. 9, the lead angle control circuit 10' has an amplifying section 1, a sampling section 2, a peak-hold section 3, an upper-limit voltage limit section 4, a lead angle data generating section 6, and voltage-dividing circuits 7 and 8. Namely, the lead angle data generating section 6' and the voltage-dividing circuits 7 and 8 of the lead angle control circuit 10' are different from those in the first embodiment of FIG. 2. Since the other circuit configurations are the same as the first embodiment of FIG. 2, the same components are assigned the same reference numerals, and descriptions thereof are omitted.

The voltage-dividing circuit 7 voltage-divides an upper limit voltage UL into ⅓ and supplies the voltage-divided voltage UL/3 as a changing point voltage Va1 to the lead angle data generating section 6'.

The voltage-dividing circuit 8 voltage-divides the upper limit voltage UL into ⅔ and supplies the voltage-divided voltage 2UL/3 as an additional changing point voltage Va2 to the lead angle data generating section 6'.

As in the first embodiment, the lead angle data generating section 6' generates a relationship line between the lead angle data representing the lead angle and the lead angle control signal LA and generates the lead angle data based on the relationship line and the lead angle control signal LA. The lead angle data generating section 6' further receives a lead angle setting voltage LAC1 from a terminal T31 and an additional lead angle setting voltage LAC2 from a terminal T32.

Figure 10:
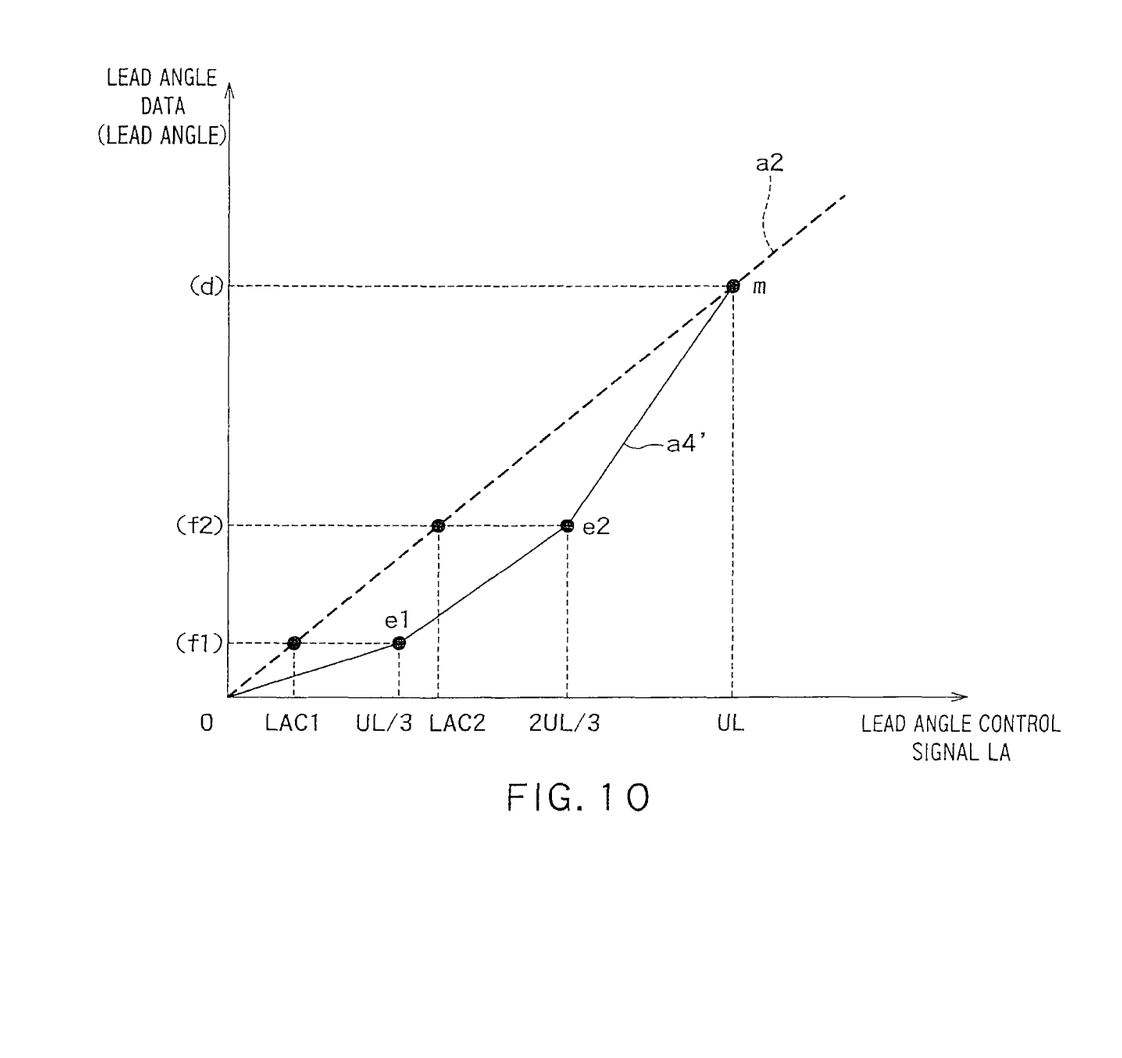
FIG. 10 is a view showing a relationship line between a lead angle control signal and a lead angle data (lead angle) in the lead angle control circuit according to the second embodiment.

Next, the relationship line of the lead angle data generating section 6' will be described.

FIG. 10 is a view showing a relationship line a4' between the lead angle control signal LA and the lead angle data (lead angle) in the lead angle control circuit 10' according to the second embodiment. FIG. 10 corresponds to FIG. 3 of the first embodiment.

The relationship line a4' reaches an upper limit point m from an original point through a changing point e1 and an additional changing point e2. In the changing point e1, the lead angle control signal LA is a changing point voltage Va1 (=UL/3), and the lead angle data represents a lead angle f1 corresponding to the lead angle setting voltage LAC1. In the additional changing point e2, the lead angle control signal LA is an additional changing point voltage Va2 (=2UL/3), and the lead angle data represents a lead angle f2 corresponding to the additional lead angle setting voltage LAC2. In this embodiment, the lead angle f2 is larger than the lead angle f1. The upper limit point m is the same as that of FIG. 3.

In the relationship line a4', a portion between the original point and the changing point e1, a portion between the changing point e1 and the additional changing point e2, and a portion between the additional changing point e2 and the upper limit point m are straight lines. Namely, the relationship line a4' is a broken line whose inclination is changed at the changing point e1 and the additional changing point e2.

Since the motor current and the lead angle control signal LA are proportional to each other, by virtue of the above-described relationship between the lead angle control signal LA and the lead angle data (lead angle), the relationship between the motor current and the lead angle data (lead angle) is a broken line. Namely, the lead angle can be controlled based on the broken line approximating a curved line of the optimum lead angle characteristics.

As described above, according to the present embodiment, the relationship line a4' passes through the changing point e1 and the additional changing point e2. As in the first embodiment, the lead angle setting voltage LAC1 and the additional lead angle setting voltage LAC2 are adjusted, thereby the lead angle data, that is, the lead angle at the changing point e1 and the additional changing point e2 can be freely adjusted, so that the relationship line a4' which is the broken line can be adjusted. Namely, the degree of freedom in control of the lead angle can be more improved than the first embodiment. Accordingly, since the relationship line a4' closer to the optimum lead angle characteristics can be obtained, control closer to the optimum lead angle characteristics is realized, and the efficiency of the motor M can be improved.

According to the first and second embodiments described above, the lead angle of the motor can be suitably controlled with a simple structure.

(Modification)

In the above descriptions, an example in which the relationship line passes through the one or two changing points has been described, the embodiment is not limited to this example. Namely, the relationship line further passes n (n is a positive integer) additional changing points, and n pairs of an additional changing point voltage and an additional lead angle setting voltage may be supplied to the lead angle data generating sections 6 and 6'. In this case, each additional changing point voltage is less than the upper limit voltage UL. In each additional changing point, the lead angle control signal is the corresponding additional changing point voltage, and the lead angle data represents the lead angle corresponding to the corresponding additional lead angle setting voltage. The lead angle control circuit may comprise a voltage-dividing circuit which voltage-divides the upper limit voltage UL into a plurality of voltages and supplies the voltage-divided voltages as the changing point voltage and the additional changing point voltages to the lead angle data generating sections 6 and 6'. For example, in the relationship line, a portion between the points adjacent to each other among the lower limit point, the changing point, the additional changing points, and the upper limit point is a straight line. By virtue of the provision of a plurality of changing points, the relationship line further close to the optimum lead angle characteristics can be obtained.

The changing point voltage Va may not be ½ of the upper limit voltage UL as long as it is less than the upper limit voltage UL. Similarly, the changing point voltage Va1 and the additional changing point voltage Va2 may be less than the upper limit voltage UL.

Further, in the first embodiment, the voltage-dividing circuit 5 is not provided, and the changing point voltage Va may be supplied from outside the lead angle control circuit 10. Similarly, in the second embodiment, the voltage-dividing circuits 7 and 8 are not provided, and the changing point voltage Va1 and the additional changing point voltage Va2 may be supplied from outside the lead angle control circuit 10'.

Furthermore, although an example in which the relationship lines a4 and a4' are broken lines has been described, the embodiment is not limited to this example. For example, in the relationship line a4, a portion between the original point and the changing point e and a portion between the changing point e and the upper limit point m may not be strict straight lines.

Furthermore, although an example in which the lower limit point is the original point has been described, the embodiment is not limited to this example. For example, the lower limit point may be determined as a point other than the original point by a voltage supplied from outside.

At least a portion of the lead angle control circuit 10 and the motor drive device 100 described in the above embodiments may be constituted by hardware or software. In the software configuration, a program realizing at least a portion of the functions of the lead angle control circuit 10 and the motor drive device 100 is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the functions of the lead angle control circuit 10 and the motor drive device 100 may be distributed through a communication line (including wireless communication) such as the Internet. While the program is encrypted, modulated, or compressed, the program may be distributed through a wired line or a wireless line such as the Internet, or the program stored in a recording medium may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A lead angle control circuit configured to control a lead angle of a motor drive signal driving a motor, comprising:
    a control signal generating section configured to generate a control signal corresponding to a motor current flowing through the motor;
    an upper limit voltage limit section configured to receive an upper limit voltage and configured to output a lead angle control signal obtained by limiting a maximum value of the control signal to the upper limit voltage; and
    a lead angle data generating section configured to generate a relationship line between lead angle data representing the lead angle and the lead angle control signal, and configured to generate the lead angle data based on the relationship line and the lead angle control signal,
    wherein the lead angle data generating section receives a changing point voltage and a lead angle setting voltage, the changing point voltage being less than the upper limit voltage,
    the relationship line reaching an upper limit point from a lower limit point through a changing point,
    in the changing point, the lead angle control signal being the changing point voltage, the lead angle data representing the lead angle corresponding to the lead angle setting voltage, and
    in the upper limit point, the lead angle control signal being the upper limit voltage, and the lead angle data representing a maximum lead angle.

2. The lead angle control circuit according to claim 1, further comprising a voltage-dividing circuit configured to voltage-divide the upper limit voltage and configured to supply the voltage-divided voltage as the changing point voltage to the lead angle data generating section.

3. The lead angle control circuit according to claim 1, wherein in the relationship line, a portion between the lower limit point and the changing point and a portion between the changing point and the upper limit point are straight lines.

4. The lead angle control circuit according to claim 1, wherein the relationship line is a broken line whose inclination is changed at the changing point.

5. The lead angle control circuit according to claim 1, wherein the lower limit point is an original point.

6. The lead angle control circuit according to claim 1, wherein the changing point is set so that a relationship between the motor current and the lead angle approximates a curved line of optimum lead angle characteristics.

7. The lead angle control circuit according to claim 2, wherein the voltage-dividing circuit voltage-divides the upper limit voltage into ½.

8. The lead angle control circuit according to claim 1, wherein the control signal generating section comprises
an amplifying section configured to amplify a motor current signal obtained by converting the motor current into a voltage, and
a peak-hold circuit configured to peak-hold a signal amplified by the amplifying section to convert the signal into the control signal, the control signal being a DC voltage.

9. The lead angle control circuit according to claim 8, wherein the peak hold circuit comprises
a sampling section configured to sample the signal amplified by the amplifying section, and
a peak-hold section configured to peak-hold a signal sampled by the sampling section to output the control signal.

10. The lead angle control circuit according to claim 1, wherein the lead angle setting voltage is lower than the changing point voltage.

11. The lead angle control circuit according to claim 1, wherein the lead angle setting voltage is higher than the changing point voltage.

12. The lead angle control circuit according to claim 1, wherein the relationship line further passes through n (n is a positive integer) additional changing points,
the lead angle data generating section receives n pairs of an additional changing point voltage and an additional lead angle setting voltage, each of the additional changing point voltages is less than the upper limit voltage, and
in each of the additional changing points, the lead angle control signal is the corresponding additional changing point voltage, and the lead angle data represents the lead angle corresponding to the corresponding additional lead angle setting voltage.

13. The lead angle control circuit according to claim 12, comprising a voltage-dividing circuit configured to voltage-divide the upper limit voltage into a plurality of voltages and configured to supply the plurality of voltage-divided voltage as the changing point voltage and the additional changing point voltages to the lead angle data generating section.

14. The lead angle control circuit according to claim 12, wherein in the relationship line, a portion between the points adjacent to each other among the lower limit point, the changing point, the additional changing points, and the upper limit point is a straight line.

15. The lead angle control circuit according to claim 12, wherein the relationship line is a broken line whose inclination is changed at the changing point and the additional changing points.

16. The lead angle control circuit according to claim 12, wherein the lower limit point is an original point.

17. The lead angle control circuit according to claim 12, wherein the changing point and the additional changing points are set so that a relationship between the motor current and the lead angle approximates a curved line of optimum lead angle characteristics.

18. A motor drive device configured to drive a motor with a motor drive signal in which a lead angle is controlled, comprising:
a control signal generating section configured to generate a control signal corresponding to a motor current flowing through the motor;
an upper limit voltage limit section configured to receive an upper limit voltage and configured to output a lead angle control signal obtained by limiting a maximum value of the control signal to the upper limit voltage;
a lead angle data generating section configured to generate a relationship line between lead angle data representing the lead angle and the lead angle control signal, and configured to generate the lead angle data based on the relationship line and the lead angle control signal; and
a motor drive signal generating section configured to generate the motor drive signal in which the lead angle is controlled, based on the lead angle data and a position signal representing a rotational position of the motor,
wherein the lead angle data generating section receives a changing point voltage and a lead angle setting voltage, the changing point voltage being less than the upper limit voltage,
the relationship line reaches an upper limit point from a lower limit point through a changing point,
in the changing point, the lead angle control signal is the changing point voltage, and the lead angle data represents the lead angle corresponding to the lead angle setting voltage, and
in the upper limit point, the lead angle control signal is the upper limit voltage, and the lead angle data represents a maximum lead angle.

19. The motor drive device according to claim 18, wherein the motor drive signal generating section comprises:
a phase counter configured to generate a phase signal, in which the lead angle is controlled, based on the lead angle data and the position signal;
a waveform generation logic configured to generate a switching section drive signal based on the phase signal and an amplitude signal supplied from outside, the switching section drive signal being a PWM signal, a pulse width of the switching section drive signal being controlled corresponding to the amplitude signal; and
a switching section comprising a plurality of switching transistors, the plurality of switching transistors being controlled to on or off by the switching section drive signal, whereby the motor drive signal being supplied to the motor.

20. A motor drive system, comprising:
a motor;
the motor drive device according to claim 18; and
a resistor connected between the switching section of the motor drive device and a ground, and configured to convert the motor current flowing through the motor into a motor current signal,
wherein the control signal generating section of the motor drive device generates the control signal based on the motor current signal.

* * * * *